(12) United States Patent
Commons et al.

(10) Patent No.: US 7,613,663 B1
(45) Date of Patent: *Nov. 3, 2009

(54) INTELLIGENT CONTROL WITH HIERARCHAL STACKED NEURAL NETWORKS

(76) Inventors: Michael Lamport Commons, 234 Huron Ave., Cambridge, MA (US) 02138-1328; Mitzi Sturgeon White, 762 Belmont St., Watertown, MA (US) 02472

( * ) Notice: Subject to any disclaimer, the term of this patent is extended or adjusted under 35 U.S.C. 154(b) by 0 days.

This patent is subject to a terminal disclaimer.

(21) Appl. No.: 11/612,268

(22) Filed: Dec. 18, 2006

Related U.S. Application Data

(63) Continuation of application No. 10/261,560, filed on Sep. 30, 2002, now Pat. No. 7,152,051.

(51) Int. Cl.
*G06E 1/00* (2006.01)
*G06E 3/00* (2006.01)

(52) U.S. Cl. .................. 706/15; 700/28; 600/545
(58) Field of Classification Search ............ 706/15, 706/45; 700/17, 28; 600/558
See application file for complete search history.

(56) References Cited

U.S. PATENT DOCUMENTS 7,024,276 B2 * 4/2006 Ito ........................... 700/245

| 2004/0015906 A1 * | 1/2004 | Goraya .................. 717/141 |
| 2004/0049124 A1 * | 3/2004 | Kullok et al. ............ 600/558 |
| 2006/0155660 A1 * | 7/2006 | Koshizen et al. ......... 706/18 |

* cited by examiner

*Primary Examiner*—David R Vincent
*Assistant Examiner*—Kalpana Bharadwaj
(74) *Attorney, Agent, or Firm*—Hoffberg & Associates

(57) ABSTRACT

An intelligent control system based on an explicit model of cognitive development (Table 1) performs high-level functions. It comprises up to O hierarchically stacked neural networks, $N_m, \ldots, N_{m+(O-1)}$, where m denotes the stage/order tasks performed in the first neural network, $N_m$, and O denotes the highest stage/order tasks performed in the highest-level neural network. The type of processing actions performed in a network, $N_m$, corresponds to the complexity for stage/order m. Thus $N_1$ performs tasks at the level corresponding to stage/order 1. $N_5$ processes information at the level corresponding to stage/order 5. Stacked neural networks begin and end at any stage/order, but information must be processed by each stage in ascending order sequence. Stages/orders cannot be skipped. Each neural network in a stack may use different architectures, interconnections, algorithms, and training methods, depending on the stage/order of the neural network and the type of intelligent control system implemented.

20 Claims, 5 Drawing Sheets

INTELLIGENT CONTROL WITH HIERARCHAL STACKED NEURAL NETWORKS

BACKGROUND OF THE INVENTION

This invention relates to hierarchical stacked neural networks that learn through processing information and constructing new actions in a manner that simulates cognitive development in the human brain. Such networks are used to build systems that learn and make complex decisions in the same manner as the human brain. The present invention models the ordered stages that the brain moves through during development that allow it to perform increasingly complex actions at higher stages of development. In this developmental process, actions performed at a particular stage of development are created by ordering, combining, and transforming the actions performed in the immediately preceding stage. As a result of this process, at each stage of development more complex actions can be performed than those performed at the immediately preceding stage.

Actions include all operations performed by a neural network that result in a change of state of the system. Actions are combined to perform tasks. More complex actions permit the performance of more complex tasks.

Prior-art neural networks, in contrast to the present invention, are not modeled on the cognitive development of the human brain. They employ simple models of both biological systems and the physiological structure of the brain to process information and perform tasks. When prior-art, architecturally distinct neural networks are linked together to form hierarchies, the complexity of the actions performed in consecutive neural networks does not increase at higher levels in a hierarchy. Actions performed in lower level networks in the hierarchy are not systematically ordered, combined, and transformed to create higher-stage actions in higher-level networks in the hierarchy in the manner that the human brain uses during learning and development. As a result, prior-art neural networks, whether or not hierarchical, cannot perform many of the complex tasks that humans perform easily.

Neural networks were developed initially to overcome the limitations of expert systems that solve problems and make decisions based on predetermined decision sets and responses. These expert systems have no intelligence, that is, they lack the ability to learn, because they are able to solve only those problems that their creators have already solved. Neural networks were created to overcome these limitations with models of neural systems that simulate the brain's capacity to learn novel representations and to tolerate ambiguity, both symbolic and informational.

Neural networks are based on simple models of how neural systems function in the brain. The primary component of neural systems in the brain are neurons. In the brain, each neuron is typically connected electrochemically to thousands of other neurons. A neuron is activated when the electrochemical stimulation that it receives from surrounding neurons reaches a threshold value. The neuron then "fires", sending electrochemical signals that either activate or inhibit surrounding neurons, which may in turn become activated and "fire."

The simplest prior-art neural networks comprise a series of artificial neurons. Unidirectional signals pass between artificial neurons over predetermined connections. Each neuron typically receives signals from a number of other neurons. Each connection between one neuron and another has a weight associated with it that represents the strength of the sending neuron's signal. An activation function associated with the receiving neuron multiplies and sums the weights of the signals that it receives from other neurons and computes whether the neuron will fire. When the neuron fires, it sends signals that either activate or inhibit other internal neurons or cause the network to output an external response. Connection weights between neurons are adjusted by training algorithms based on the neural network's production of successful outputs. These connection weights comprise the neural network's knowledge or learning.

Prior-art neural networks improve task performance, information processing, and decision making by expanding the core biological model of neural function and brain structure. Approaches include, but are not limited to, adding layers of neurons, increasing the interconnections between neurons, restructuring the relationships between groups of neurons to more closely parallel brain structure, and developing more efficient training and processing algorithms through more sophisticated mathematical modeling. Because prior-art neural networks model only neural function and the physiological structure of the brain, they are limited in their capacity to perform tasks, solve problems, and manipulate complex information in the same manner as the human brain, which performs complex tasks by hierarchically combining and ordering lower-stage actions.

To increase the capacity of prior-art neural networks to solve problems accurately and to expand their abstract abilities, some prior-art neural networks comprise more than one neural network. Architecturally distinct neural networks are linked to other networks hierarchically, in parallel, in tree structures, or in other configurations. Such linked neural networks allow greater levels of abstraction and multiple views of problems. In prior-art neural networks that are linked hierarchically, information moves up through the system of neural networks, with output from each lower-level neural network cascading up to the level above it. The lower levels identify patterns based on the input stimuli. These patterns are then fed to the higher levels, with input noise reduced and with increasingly narrow representations identified, as output from one neural network moves to the next. In this movement through the series of networks, a winnowing process takes place, with information reduced as decisions are made concerning the identity of the object or concept represented by a pattern. Thus, in the process of eliminating the noise in the input stimuli, the complexity, subtlety, and meaning of information are lost. Neural networks at higher levels operate on less information than neural networks at lower levels, and their tasks become simpler rather than more complex. The result is that complexity and context, which are critical for meaning, are lost.

This simplification is contrary to how the human brain operates at higher stages of development. At such higher stages, the brain's capacity to process complex information and distinguish between finer shades of meaning increases rather than decreases. The brain increases its capacity during development by ordering, combining, and transforming lower-level actions to construct new actions that respond to a richer array of stimuli and greater levels of meaning, with the result that the brain can perform more complex tasks.

Prior-art neural networks modeled on core neural processes and brain structure have made advances in artificial intelligence, such as recognizing written letters and numbers, reading English text aloud, playing rule-based games such as chess, and determining whether sonar echoes have been reflected from undersea rocks or from mines. They have not been able to simulate the human brain's capacity to assign higher levels of meaning to speech and deduce complex interrelationships between objects, time sequences, and conceptual categories. In other words, prior-art neural networks cannot perform the higher-level cognitive operations performed by the human brain. While neural systems and brain structure provide a basis for neural networks to perform low-level cognitive functions, such a reductionist model limits the capacity of prior-art neural networks to learn how to perform higher level actions, thereby making decisions based on meaning and nuances between input stimuli. Therefore prior-art neural networks simulate the functioning of the human brain on only a simple neuronal level that lacks the human brain's capacity to make the higher-level distinctions and perform the higher-level tasks that humans perform with ease. Thus there is a need for a system of hierarchical stacked neural networks that can simulate the human brain more closely and for methods to employ such a system to learn to perform tasks on its own.

OBJECTS AND SUMMARY OF THE INVENTION

It is an object of the present invention to provide hierarchical stacked neural networks that overcome the limitations of the neural networks of the prior art.

It is another object of the present invention to provide linked but architecturally distinct hierarchical stacked neural networks that simulate the brain's capacity to organize lower-order actions hierarchically by combining, ordering, and transforming the actions to produce new, more complex higher-stage actions.

It is a further object of the present invention to provide hierarchical stacked neural networks that are ordered in a non-arbitrary fashion so that actions performed by neural networks at a higher level are the product of a concatenation of actions performed by lower-level networks in the hierarchy.

It is yet a further object that the actions performed by a neural network in the stacked hierarchy are a product of combining, ordering, and transforming actions performed by the neural network that immediately precedes it at a lower level in the stacked hierarchy.

It is still a further object of the present invention that neural networks at higher levels in the hierarchy perform increasingly more complex actions and tasks than neural networks that precede them at a lower level in the hierarchy.

The present invention provides an architecture of hierarchically linked, distinct neural networks stacked one on top of the other. Each neural network in the hierarchical stack uses the neuron-based methodology of prior-art neural networks. The actions and tasks that each neural network performs and the order in which they perform those actions and tasks are based on human cognitive development.

While different models have been developed of the stages of cognitive development, all share the following common features. Cognitive development in human beings proceeds through a series of ordered stages. Actions and tasks performed at a particular stage are always more complex than the actions and tasks performed in the immediately preceding stage. The capacity to perform the actions at the higher stage results from a learning process that combines, orders, and transforms the actions at the immediately preceding stage. The creation of higher-stage actions from immediately preceding lower-stage actions provides the higher stage with the capacity to perform more complex tasks. (R. Case (1987) "The structure and process of intellectual development" *International Journal of Psychology* 22(5-6), 571-607; M. L. Commons et al. (1998), "The existence of developmental stages as shown by the hierarchical complexity of tasks." *Developmental Review* 8 (3), 237-278; M. L. Commons & P. M. Miller (1998), "A quantitative behavior-analytic theory of development" *Mexican Journal of Experimental Analysis of Behavior,* 24 (2), 153-180; K. W. Fischer (1980) "A theory of cognitive development: The control and construction of hierarchies of skills" *Psychological Review* 87(6), 477-531.)

An example of this increasing complexity is shown by the complex multi-dimensional actions that can be performed by solving problems with matrix algebra rather than simpler one-dimensional algebraic equations. In matrix algebra the actions performed in one-dimensional algebra are combined, reordered, and transformed in a manner similar to what occurs during human cognitive development. This development of a new conceptual structure makes it possible for to perform with matrix algebra more sophisticated and complex mathematical operations than with simple algebra.

Another example of how more complex actions are performed at a higher stage is illustrated by the early cognitive development of children. At one of the earliest stages of human cognitive development, an object only exists for a child when it is present. At a later stage, the child is able to retain an abstract representation of the object when it is not present. The actions that the child used to represent the object when it was present have been combined, reordered, and transformed to permit the child to retain an internal representation of the object when it is not present.

The number of neural networks in a hierarchical stack of the present invention is based on research on the cognitive organization of the brain. This research shows that the number of stages or orders needed to accomplish any given task depends directly on the order of hierarchical complexity of the tasks to be performed. (See M. L. Commons, et al., supra; M. L. Commons & P. M. Miller, supra. The research literature on human cognitive development uses term "stage" to denote a level of development; the term "order", to distinguish between levels and to denote the hierarchical sequence of networks.)

The number of networks in a hierarchical stacked neural network of the present invention is determined through an analysis of the tasks to be performed. The number always equals the highest order of hierarchical complexity of any task performed. Thus, if a neural network of the present invention is to perform the more advanced functions of a human brain, such as driving a car, the number is determined by the order of the most complex task needed to accomplish this behavior.

This number of networks is unlimited. Indeed, a hierarchical stacked neural network of the present invention may surpass the capabilities of the human brain. Humans can (in maximal, rare cases) process task demands of up to fourteen stages/orders of hierarchical complexity. (M. L. Commons & F. A. Richards, "Four postformal stages", in J. Demick (Ed.), *Handbook of adult development* (New York, Plenum, 2002)). Robotic and decision-making systems running hierarchical stacked neural networks of the present invention, however, are not limited to 14 stages/orders. Thus, for example, a system designed to diagnose diseases could consider all known factors affecting a disease at once and not be limited, as human physicians are, to consider problems only within their specialties. Moreover, a robotic system that drives a car could sample far more control parameters and domains of environmental stimuli and thus make safer, more accurate driving decisions than could a human.

The actions performed in the first neural network in a hierarchical stacked neural network of the present invention are the lowest stage/order actions in the sequence of actions to be performed. The actions performed in each successively higher-level neural network in the hierarchical stack are a product of combining, ordering, and transforming the actions in the immediately preceding neural network in the hierarchical stack. This combining, ordering, and transforming makes it possible for each successive neural network in the hierarchical stack to perform more complex tasks and solve more difficult problems than the neural network in the immediately preceding stage/order. As a result, higher-level neural networks in the hierarchical stack of the present invention begin to more closely simulate the human brain's capacity to interrelate complex input stimuli and create meaning, and, as a consequence, respond appropriately to an ever-widening band of environmental and internal stimuli.

In the present invention, higher-level neural networks communicate with lower level neural networks in the hierarchical stacked neural network. The higher-level neural networks provide feedback to the lower-level neural networks to adjust connection weights, thereby improving the accuracy of the actions performed at the lower levels. The higher-level neural networks can also request that additional information be fed to the lowest neural network in the stacked hierarchy.

For the hierarchical stacked neural network of the present invention to perform tasks such as driving a car, the network must learn lower-order tasks before higher-order tasks. Training begins with the first neural network in the hierarchical stack and ends with the last neural network in the stack. Output from each neural network provides the training input for the next higher neural network in the hierarchical stack. A neural network can also be trained by transferring the contents of a previously-trained neural network at the same stage/order of hierarchical complexity. This transfer requires reading the state of every node of the trained network and setting the nodes in the new network to the same values. Thus the learning gained by a neural network at a particular stage/order can reduce the learning curve for neural networks in a hierarchical stacked neural network.

Briefly stated, the present invention provides an intelligent control system that performs high-level human functions, such as monitoring complex human activity and responding to simple language. It comprises up to 0 stacked neural networks, $N_m, \ldots, N_{m+(O-1)}$, where m denotes the stage/order tasks that are performed in the first neural network, $N_m$, in the hierarchical stack, and O denotes the highest stage/order tasks that are performed in the highest-level neural network in the hierarchical stack. The type of processing actions that are performed in a network, $N_m$, corresponds to the order of task complexity for stage/order m. Thus $N_1$ performs tasks at the level of complexity corresponding to stage/order 1. $N_5$ processes information at the level of complexity corresponding to stage/order 5. Stacked neural networks in intelligent control systems can begin at any stage/order and end at any stage/order, but information must be processed by each stage in sequence of ascending order. Stages/orders cannot be skipped. For example, if a stacked neural network begins at $N_3$ and ends at $N_6$, information would first be processed by $N_3$ and then output to $N_4$. $N_4$ would then process the information and output it to $N_5$. $N_5$ would process the information and output it to $N_6$, which would produce the final output of the stacked neural network. Each neural network in a stack may use different architectures, interconnections, algorithms, and training methods, depending on the stage/order of the neural network and the type of intelligent control system implemented.

According to an embodiment of the invention, a stacked neural network comprises a plurality of architecturally distinct, ordered neural networks; the plurality being organized in a hierarchy from lower to higher order/stages in a model of cognitive development; each member of the plurality feeding signals forward and back to other members of the plurality; the signals being defined in terms of actions available to the each member, whereby the each member transforms actions from at least one member at a lower order/stage, thereby producing nonarbitrary organizations of the actions from the at least one member at a lower order/stage effective for completing new tasks of increased complexity; the nonarbitrary organizations being fed to at least one member at a higher order/stage; and the nonarbitrary organizations being modifiable by feedback signals from members at the higher order/stages.

According to a feature of the invention, a method for intelligent control of a system comprises the steps of: forming a plurality of architecturally distinct, ordered neural networks; organizing the plurality in a hierarchy from lower to higher order/stages in a model of cognitive development; defining signals from each member of the plurality in terms of actions available to the each member; feeding the signals forward and backward to other members of the plurality, whereby nonarbitrary organizations of the actions from at least one member at a lower order/stage are formed that carry out new tasks of increased complexity; and having the capability of modifying the nonarbitrary organizations by feedback signals from at least one member at a higher order/stage.

According to another feature of the invention, a computer-readable storage medium embodies program instructions for a method for intelligent control, the method comprising the steps of: forming a plurality of architecturally distinct, ordered neural networks; organizing the plurality in a hierarchy from lower to higher order/stages in a model of cognitive development; defining signals from each member of the plurality in terms of actions available to the each member; feeding the signals forward and backward to other members of the plurality, whereby nonarbitrary organizations of the actions from at least one member at a lower order/stage are formed that carry out new tasks of increased complexity; and having the capability of modifying the nonarbitrary organizations by feedback signals from at least one member at a higher order/stage.

The above, and other objects, features, and advantages of the present invention will become apparent from the following description read in conjunction with the accompanying drawings, in which like reference numerals designate the same elements.

DESCRIPTION OF THE PREFERRED EMBODIMENT

Figure 1:
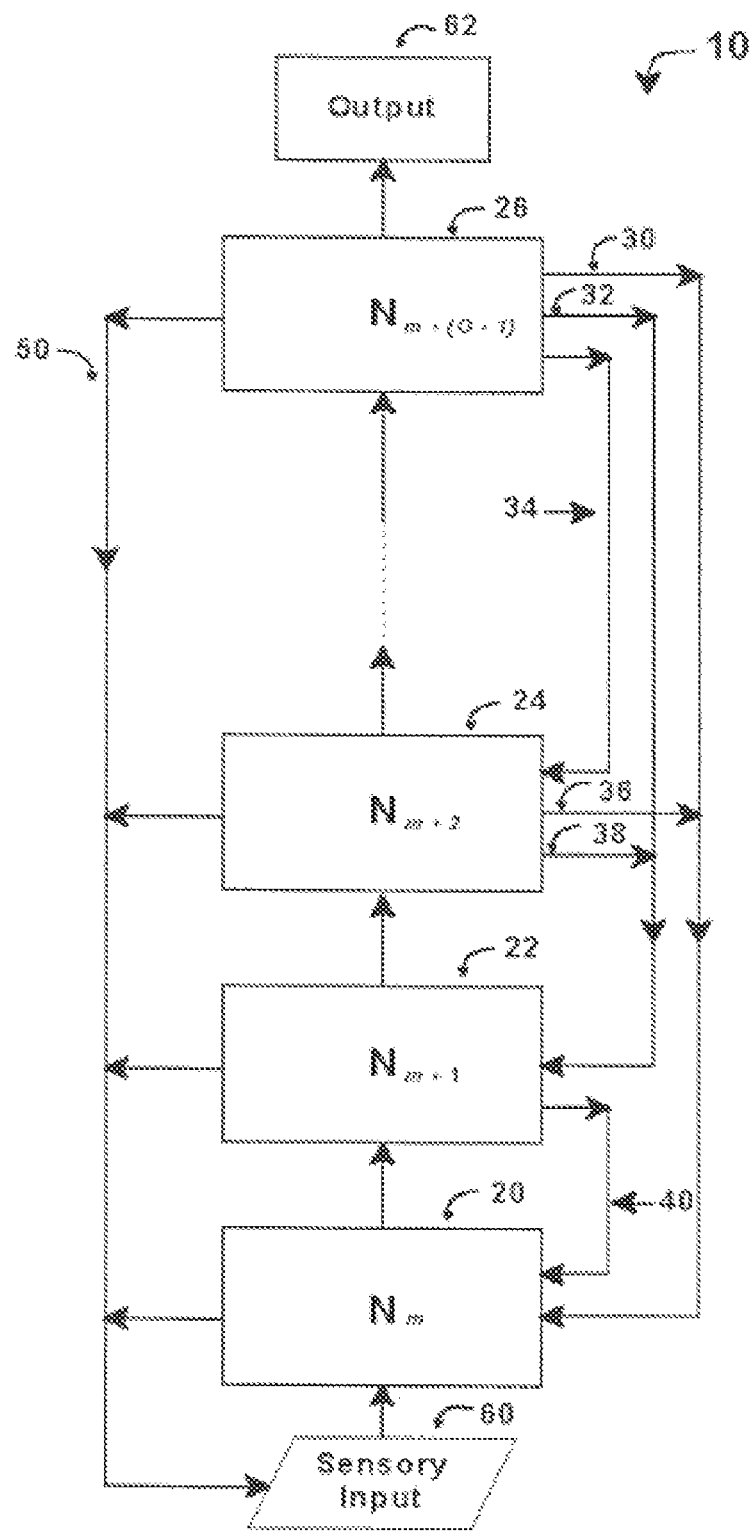
FIG. 1 is a block diagram of the stacked neural network of the present invention.

Before constructing a hierarchical stacked neural network of the present invention, the builder must determine the order of hierarchical complexity of the tasks that the hierarchical stacked neural network will perform. The highest order of hierarchical complexity found from this determination dictates the number of neural networks that the hierarchical stacked neural network requires. In making this determination, the order of hierarchical complexity is measured by the number of recursions that the coordinating actions must perform on a set of primary elements. Actions at a higher order of hierarchical complexity:

1) are defined in terms of the lower-order actions;
2) organize and transform the lower-order actions;
3) produce nonarbitrary organizations of these lower-order actions that solve new, more complex tasks.

The following equation determines the order of hierarchical complexity of the task, i.e., the number of concatenation operations it contains. In a concatenation, a coordinating action is performed on two or more of the immediately preceding necessary lower-order actions. The products of this coordinating action then become the lower-order elements of the next higher-order coordinating action. The next higher-order coordinating action is performed again on the new, more hierarchically complex elements generated from the previous order. From this coordinating action one derives the products of the new, higher-order performance of the action, which become prerequisite elements of an action of a still higher order, and that higher-order action is performed again.

The order, 0, of hierarchical complexity of task T is denoted O(T), and defined as follows:

(a) For a simple task $E_1$ at the lowest order in the hierarchical complexity, $O(E_1)=1$.

(b) Otherwise, $O(E)=O(E')+1$, where $O(E')=\max(C(E_1, C(E_2, \ldots C(E_n)))$, for all $E_{i=1 \ldots n}$ in E.

In other words, the order of the next higher-order task is one order of hierarchical complexity more than the next lower-order task out of which it is built. If task E is built out of tasks of different orders of hierarchical complexity, then E' has the maximum order of all of the tasks within it. Consider the example of distributivity, $3*(9+2)=(3*9)+(3*2)=27+6=33$, where the numbers come from counting objects. The maximum order of the subtasks would be based on the "adding" and "multiplying" actions (order 7), not the "counting" actions (order 6) (See Table 1 below).

The hierarchical complexity of any task in a task sequence may be determined through such task analysis. The hierarchical complexity of a task therefore refers to the number of concatenation operations it contains. An order-three task has three concatenation operations. A task of order three operates on the output of a task of order two, and a task of order two operates on the output of a task of order one (i.e.; a simple task).

Table 1 provides an example of 14 stages/orders of hierarchical complexity identified for human beings through research on human development. It uses in part mathematical operations to illustrate how tasks at a higher stage/order build on tasks at lower stages. Higher-order tasks are created from the preceding lower stage/order tasks by concatenation of lower-order tasks. Other examples, with fewer or more stages/orders of hierarchical complexity, are also available.

Referring to FIG. 1, a hierarchical stacked neural network 10 of the present invention comprises a plurality of up to 0 architecturally distinct, ordered neural networks 20, 22, 24, 26, etc., of which only four ($N_m$, $N_{m+1}$, $N_{m+2}$, $N_{m(O-1)}$) are shown. The number of neural networks in hierarchical stacked neural network 10 is the number of consecutive stages/orders needed to complete the task assigned. A sensory input 60 to stacked neural network 10 enters lowest stage/order neural network 20. The output of each of neural networks 20, 22, 24, 26, etc., is the input for the next neural network in the stack. The highest stage/order neural network 26 in the hierarchical stack produces an output 62. Each of neural networks 20, 22, 24, 26, etc., except for the first in the hierarchical stack, neural network 20, can provide feedback 30, 32, 34, 36, 38, 40 to a lower stage/order neural network 20, 22, 24, etc. This feedback adjusts weights in lower stage/order neural networks. Neural networks in the hierarchical stack 20, 22, 24, 26 . . . can send a request 50 for sensory input 60 to feed more information to neural network 20. A neural network can send this request when its input does not provide enough information for it to determine an output.

Within a neural network in the hierarchical stack, tasks may be combined in ways that do not produce a change in stage/order. For example, iterations may repeat lower stage/order tasks, e.g., repeatedly adding a sequence of numbers. A mixture may include combining simple addition and multiplication. A chain may include arbitrarily linking lower-stage/order tasks that are not conceptually related. In the case of a change in stage/order, a transformation of lower-stage/order operations may use a new construct to combine lower-order tasks that incorporate tasks at a lower stage/order but create a new way of structuring the set of relationships. One example is using matrix algebra so that lower-order operations, e.g., adding and multiplying, become part of the matrix algebra tasks within a multi-dimensional domain.

Figure 2:
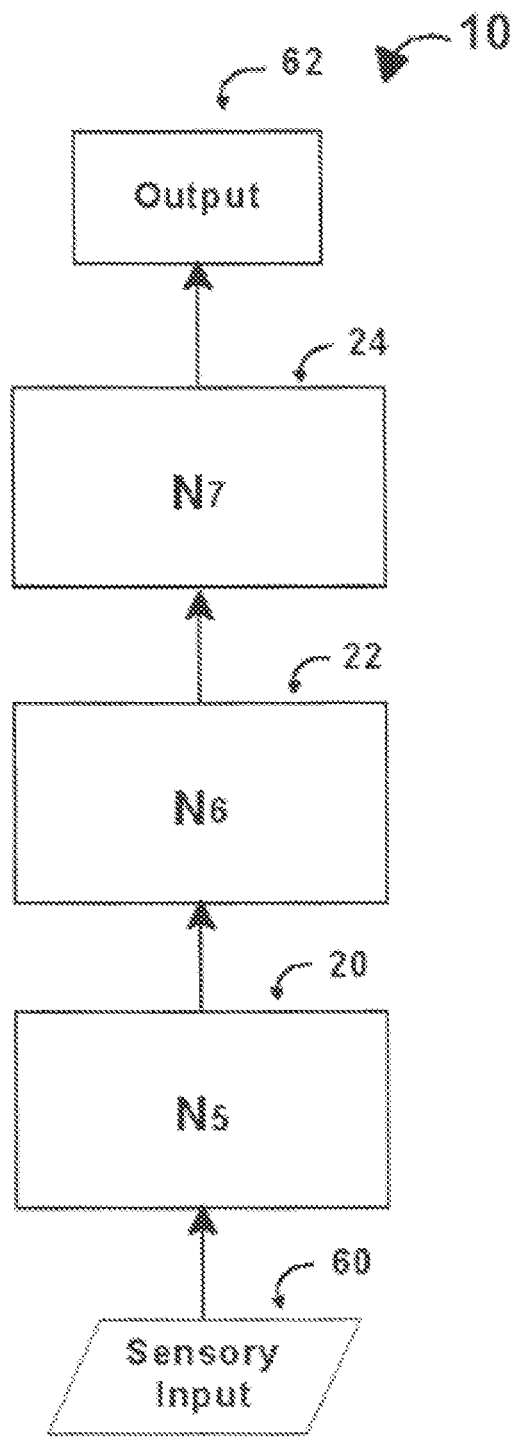
FIG. 2 is a block diagram of an embodiment of the stacked neural network of The present invention comprising three architecturally distinct, ordered neural networks.

Referring to FIG. 2, in another embodiment of the present invention, stacked neural network 10 has three architecturally distinct ordered neural networks, 20, 22, and 24. Neural network 20 performs stage/order 5 actions to process sensory input 60. The output from neural network 20 is input to neural network 22, which processes the output from neural network 20 using stage/order 6 actions. The output from neural network 22 is input into neural network 24 that processes the output from neural network 22 using stage/order 7 actions. In this embodiment, neural network 22 does not provide feedback to lower stage/order neural network 20, and neural network 24 does not provide feedback to lower stage/order neural networks 22 and 20. Neural networks 20, 22, 24 do not send requests 50 for additional sensory input 60 to neural network 20.

Figure 3:
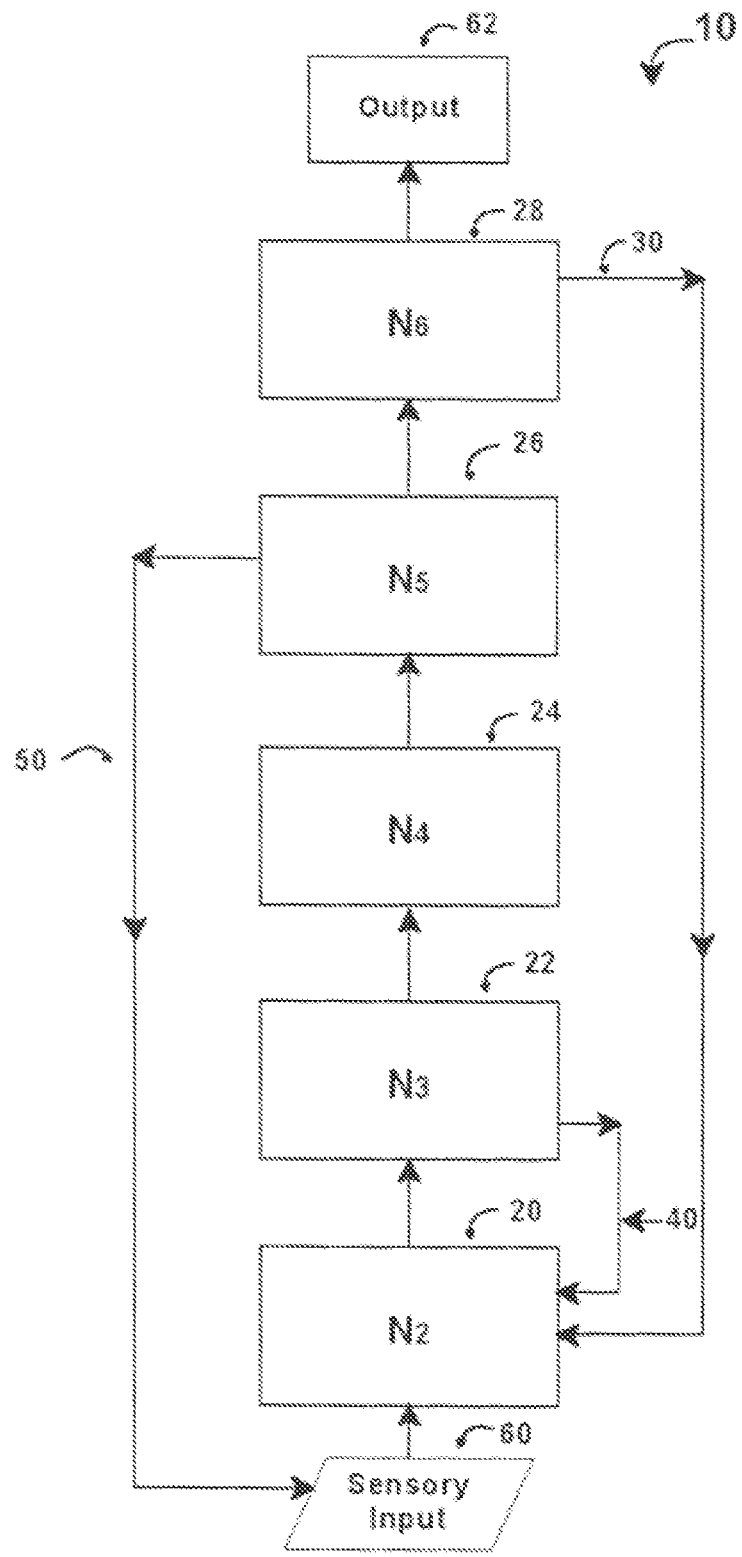
FIG. 3 is a block diagram of an embodiment of the stacked neural network of the present invention comprising five architecturally distinct, ordered neural networks.

Referring to FIG. 3, in still another embodiment, stacked neural network 10 contains five neural networks, 20, 22, 24, 26, and 28. Neural network 20 processes sensory input 60 using stage/order 2 actions. The output from neural network 20 is input into neural network 22, which processes the output from neural network 20 using stage/order 3 actions. The output from neural network 22 is input into neural network 24, which processes the output from neural network 22 with stage/order 4 actions. The output from neural network 24 is input into neural network 26, which processes the output from neural network 24 with stage/order 5 actions. The output from neural network 26 is input into neural network 28, which processes the output from neural network 26 with stage/order 6 actions. Neural network 28 is the highest neural network in the hierarchical stack and produces output 62.

In this embodiment, neural network 22 sends feedback 30 and neural network 28 sends feedback 40 to neural network 20, which uses them to adjust its weights. Neural network 26 can send a request 50 for sensory input 60 to feed more information to neural network 20 if it is unable to determine its output based on the output from neural network 24.

TABLE 1

A sequence of behaviors placed into different orders of hierarchical complexity

| Order/Stage | Name of Order of Hierarchical Complexity | Example |
|---|---|---|
| 0 | Calculatory | Simple Machine Arithmetic on 0's and 1's |
| 1 | Sensory & Motor | Seeing circles, squares, etc. or touching them. |
| 2 | Circular Sensory-motor | Reaching and grasping a circle or square. |
| 3 | Sensory-motor | A class of filled-in squares may be made |
| 4 | Nominal | That class may be named, "Squares" |
| 5 | Sentential | The numbers, 1, 2, 3, 4, 5 may be said in order |
| 6 | Pre-operational | The objects in row 5 may be counted. The last count called 5, five, cinco, etc. |
| 7 | Primary | There are behaviors that act on such classes that we call simple arithmetic operations $1 + 3 = 4$ $5 + 15 = 20$ $5(4) = 20$ $5(3) = 15$ $5(1) = 5$ |
| 8 | Concrete | There are behaviors that order the simple arithmetic behaviors when multiplying a sum by a number. Such distributive behaviors require the simple arithmetic behavior as a prerequisite, not just a precursor: $5(1 + 3) = 5(1) + 5(3) = 5 + 15 = 20$ |
| 9 | Abstract | All forms of five in the five rows in the example are equivalent in value, x = 5. Forming class based on abstract feature. |
| 10 | Formal | The general left hand distribution relation is: $x * (y + z) = (x * y) + (x * z)$ |
| 11 | Systematic | The right hand distribution law is not true for numbers but is true for proportions and sets. $x + (y * z) = (x * y) + (x * z)$ $x \bigsqcup (y \cap z) = (x \cap y) \bigsqcup (x \cap z)$ |
| 12 | Meta-systematic | The system of propositional logic and elementary set theory are isomorphic: $x \& (y \text{ or } z) = (x \& y) \text{ or } (x \& z)$ Logic $\Leftrightarrow x \cap (y \bigsqcup z) = (x \cap y) \bigsqcup (x \cap z)$ Sets $T(\text{False}) \Leftrightarrow \phi$ Empty set $T(\text{True}) \Leftrightarrow \Omega$ Universal set |
| 13 | Paradigmatic | Distributive Systems are part of the Mathematical Paradigm. Mathematics integrates algebra, set theory, elementary probability theory, analysis, and based upon such an integration generates measure theory, and the mathematics used in physics. |
| 14 | Cross-paradigmatic | Mathematics and Physics are integrated in the Mathematical Physics of Quantum Mechanics (Einstein, 1950; Planck, 1922; Bohr, 1934), including Standard Theory of Particles (Gell-Mann, 1964; Weinberg, 1983; Salam, 1972) and Special and General Relativity Theory (Einstein, 1950) |

The stacked hierarchical neural network of the present invention can be constructed only after the number of neural networks needed in the stack has been determined. The stage/order of the actions and tasks performed in a neural network in the hierarchical stack must equal the level of the neural network. Thus neural network $N_m$ performs tasks and actions at stage/order m.

The actions and tasks in each successive neural network are a combination, reordering and transforming the tasks of the immediately preceding neural network in the hierarchical stack. At each level the neural network performs actions at a higher stage/order of human cognitive development. Thus a neural network at the lowest level may only process binary information, such as whether or not an event has occurred, where a neural network operating at a higher level in the hierarchical stack may perform actions in multiple dimensions. As in human cognitive development, the neural network at the higher level makes more complex discriminations and can perform more sophisticated tasks. For example, a neural network at level 6 can perform tasks such as counting objects, where a neural network at level 7 can perform tasks that involve simple mathematical operators. Thus level 7 has moved beyond counting to a system that creates counts through a new, higher-order set of tasks (See Table 1 above).

Each neural network in the hierarchical stack can have one or more hidden layers of neurons and various interconnections. The number of hidden layers within a network and the interconnections between layers depend on the nature of the tasks that the neural network at that particular stage/order is performing. The number of tasks and types of actions that the neural network performs and the stimuli that it processes all affect the number of hidden layers, the number of neurons in a hidden layer, and the interconnections between layers. The stimuli processed by the neural network may be external, internal to the network, or previously conditioned stimuli. When the types of stimuli that the neural network processes increase, the number of hidden layers and/or the number of neurons within a layer increase.

The algorithms a particular neural network in a hierarchical stack uses to assign connection weights between neurons also vary, depending on the nature of the problem that the neural network is solving and the input and internal stimuli that the neural network processes. Specific algorithms are not associated with particular stages/orders of neural networks in the hierarchical stack. For example, a type of algorithm that assigns connection weights in a neural network at stage/order m that names geometric objects may differ from an algorithm that assigns connection weights in a neural network at stage/order m that names people.

Training is not specific to the stage/order of a neural network in a hierarchical stack. Rather it can vary based on the particular tasks being performed by a network in the hierarchical stack. Individual networks in the hierarchical stack may use unsupervised training, supervised training, or a combination of both to set initial weights. In the case of unsupervised training the neural network continues to learn, adapt, and alter its actions throughout the course of its operation. It can respond to new patterns not presented during the initial training and assignment of weights. This capacity allows a network to learn from new external stimuli in a manner similar to how learning takes place in the real world.

A neural network in the hierarchical stack can train other neural networks that operate at the same order/stage of hierarchical complexity. In this training, the information from the neural network is transferred to an architecturally distinct unit that is analogous in structure to the original neural network. This type of training constitutes a transfer of learning from one neural network to another; the new neural network does not have to be independently trained, thereby saving time and resources.

More formally stated, an intelligent control system of the present invention comprises up to O hierarchical stacked neural networks, $N_m, \ldots, N_{m+(O-1)}$, where m equals the lowest stage/order tasks performed by the hierarchical stacked neural network and O represent the highest stage/order tasks performed. The actions and tasks performed in $N_m$ correspond to the stage/order of cognitive development of the model of cognitive development employed in solving the problem. Thus $N_1$ performs tasks at the level of hierarchical complexity that corresponds to stage/order 1, and $N_5$ processes information and responds at the level of complexity that corresponds to stage/order 5. The number of neural networks in the stack depends on the order of hierarchical complexity of the tasks performed by the hierarchical stacked neural network. The number of networks always equals the highest order of hierarchical complexity of any task performed by the hierarchical stacked neural network. But, unlike the human brain, the number of networks in a hierarchical stack is not limited by the highest order of hierarchical complexity that a human can achieve. The number of networks in a hierarchical stack is unlimited and thus may exceed the capabilities of the human brain.

Referring again to FIG. 3, a stacked neural network of the present invention can begin at any stage/order of cognitive development and end at any stage/order, but information must be processed by each stage/order in sequence and ascending order. An intermediate stage/order cannot be skipped. For example, if a stacked neural network begins at $N_3$ and ends at $N_6$, information is first processed by $N_3$ and then output to $N_4$. $N_4$ then processes the information and outputs it to $N_5$. $N_5$ processes the information and outputs it to $N_6$, which produces the final output of the stacked neural network.

The stage/order at which a stacked neural network begins and ends and the number of neural networks in a hierarchical stack depend on the nature of the problem to be solved. Moreover, each neural network in a hierarchical stack may use different architectures, algorithms, and training methods. The type of architecture, algorithm, and training method selected for a particular neural network in the hierarchical stack depends on the order/stage of the neural network, the type of intelligent control system that is being implemented, the tasks to be performed and the stimuli to be processed.

Two examples of intelligent systems based on the stacked neural network of the present invention follow: the first detects shoplifting; the second directs customer calls to the correct department in a large organization. These examples follow the model of cognitive development depicted in Table 1. (See R. Case (1987), supra; M. L. Commons et al (1998), supra; M. L. Commons & P. M. Miller (1998), supra.)

First Detailed Embodiment

An Intelligent Control System to Detect Shoplifting

A store is monitored by video cameras that record information from every area of the store. The input from the cameras is broken into physical slices (input vectors), which are sampled at one-second intervals for changes in light intensity. A rule-based system calculates changes in light intensity. Delta values, $D_{ni}$, for $n=1, \ldots, n$, and $i=1, \ldots, k$, are based on the differences in light intensity between time samples, $D_{n-1,i}$ and $D_{n,i}$. The delta values are the input signals for the first neural network in the hierarchical stack.

Figure 4:
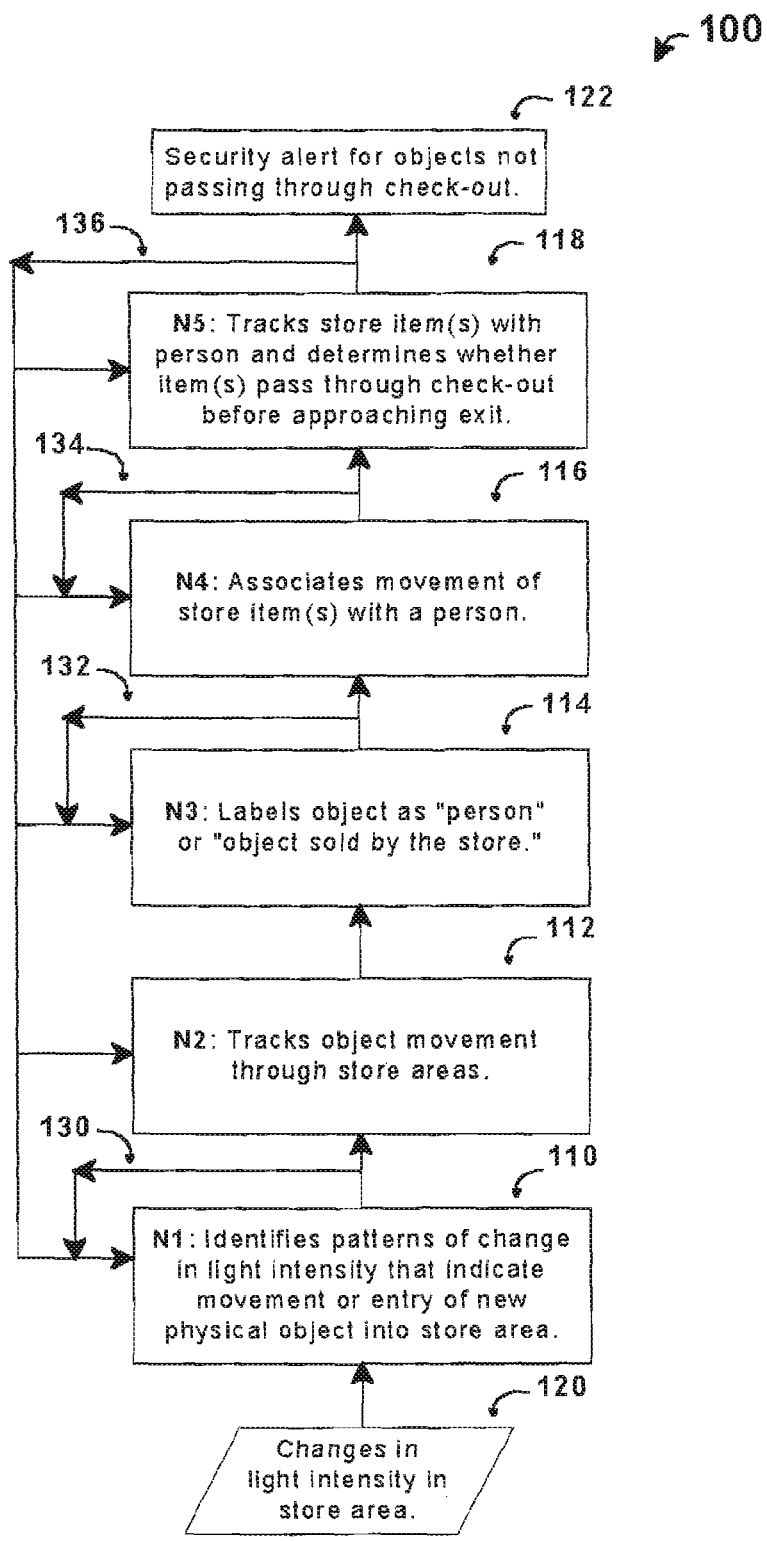
FIG. 4 is a flow chart for a first detailed embodiment of the present invention, an intelligent control system to detect shoplifting, which contains five major processing steps.

Referring to FIG. 4, an intelligent control system to detect shop lifting 100 comprises a hierarchical stack of five architecturally distinct neural networks 110, 112, 114, 116, and 118. Each neural network 110, 112, 114, 116 and 118 performs processing actions associated with a stage/order from the model described in Table 1.

The first neural network in the hierarchical stack, neural network 110 is a feed-forward neural network that performs processing actions at stage/order 1, the Sensory and Motor stage/order, of the model depicted in Table 1. At this stage/order, an intelligent system can detect whether an object is present or not. Using Sensory and Motor tasks, neural network 110 detects a change in light intensity 120 that reaches a threshold consistent with the entry or movement of a physical object within spatial areas monitored by the cameras. Neural network 110 has a hidden layer of neurons that receive inhibitory and excitatory input from the delta values and from a series of "competitive neighbor" neurons in the hidden layer that are within a predetermined range of the neurons receiving delta input. An output response to neural network 112 is triggered when threshold levels of excitation in contiguous neurons constitute a large enough area of excitation to make it highly probable that a new physical object has entered a store area or a physical object in a store area has moved. Vectors containing the excitation area's centroid, dimensions and coordinates are output to neural network 112.

Neural network 110 is trained using input arrays containing excitation patterns. A backward-propagation algorithm 130 adjusts weights in neural network 110 based on neural network 110's successes and failures in detecting physical objects.

Neural network 112 is an adaptive-resonance (ART) neural network (G. A. Carpenter & S. Grossberg, "Neural dynamics of category learning and recognition: Structural invariants, reinforcement, and evoked potentials", in M. L. Commons, R. J. Hermstein, S. M. Kosslyn, & D. B. Mumford, (Eds.), 9 *Computational and clinical approaches to pattern recognition and concept formation. Quantitative analyses of behavior* (Hillsdale, N.J., Lawrence Erlbaum Associates, 1990)). Neural network 112 performs processing actions at stage/order 2, the Circular Sensory-Motor stage/order, in the model described in Table 1. At this stage/order an intelligent system distinguishes objects and tracks them. Using Circular Sensory-Motor stage/order tasks, neural network 112 maps input excitation patterns from neural network 110 to clusters. Cluster weights are adjusted each time a new excitation pattern enters neural network 112 from neural network 110. A second hidden layer of neurons tracks excitation patterns through the store and links their movement centroids to the appropriate clusters. Repeated placement of input excitation patterns on the same cluster, when only the centroid coordinates of the patterns differ, triggers an output signal to neural network 114 when a predetermined threshold rate of continuous placement is obtained. The output signal contains the excitation area's centroid, dimensions, store coordinates, and history of centroid positions at successive time intervals. The training of neural network 112 is unsupervised. Cluster weights are adjusted each time a new excitation pattern, representing a new physical object is input into neural network 112 from neural network 110.

Neural network 114 is a feed-forward heteroassociative neural network that performs processing actions at stage/order 3, the Sensory-Motor stage/order, of the model described in Table 1. At this stage an intelligent system can recognize objects and place them in classes. Using Sensory-Motor tasks, neural network 114 analyzes patterns output by neural network 112 and determines whether a pattern is an "object sold by the store" or "a person." Patterns identified by neural network 112 need not be identical to stored patterns to activate an output signal. Stored patterns that identify "a person" are based on major human features such as a head, a face, arms, and hands. The patterns associated with "object sold by the store" use a system of weights that weight some pattern components more heavily than others.

Neural network 114 is trained by inputting patterns of "a person" and "object sold by the store." A backward-propagation algorithm 132 adjusts neural network 114's weights based on the network's successes and failures in identifying "a person" and "object sold by the store." When neural network 114 associates a pattern with an "object sold by the store" or "a person", the network outputs to neural network 116 the pattern's classification as "a person" or "object sold by the store," centroid, dimensions, store coordinates, and history of centroid positions at successive times.

Neural network 116 is a feed-forward neural network that performs processing actions at stage/order 4, the Nominal stage/order, of the model described in Table 1. At the Nominal stage/order, an intelligent system can identify simple relationships between concepts and label them. Neural network 116 has one hidden layer. The neurons in this layer receive excitatory and inhibitory input based on the centroids, dimensions, coordinates, and history of centroid positions at successive one-second time points of objects and persons that was received from neural network 114. The neurons also receive input from other neurons within the hidden layer. The determination that "a person" has picked up and retained "object(s) sold by the store" is signaled by excitatory input from neurons, within the hidden layer, activated by patterns for "object(s) sold by the store" that share contiguous and overlapping store coordinates with "a person." When "a person" has become associated with "object(s) sold by the store," an output signal is triggered. Neural network 116 then outputs to neural network 118 an array pattern for the "person" and "object(s) sold by the store" and the history of store coordinates of the person/object array at successive times. The array pattern uniquely identifies the "person" and "object sold by the store" that the "person" is carrying.

Neural network 116 network is trained using patterns of person/object interaction. A backward-propagation algorithm 134 adjusts weights each time neural network 116 successfully matches "a person" and "object sold by the store."

Neural network 118 is an adaptive-resonance (ART) neural network that performs processing actions at stage/order 5, the Sentential stage/order, of the model described in Table 1. At this stage/order, classes and patterns are ordered. Using Sentential stage/order tasks, neural network 118 tracks "a person" carrying "object(s) sold by the store" and issues a security alert 122 if the person fails to pass through a check-out counter before moving to the exit. Neural network 118 has two hidden inner layers. The person/object array pattern input from neural network 116 is mapped to a specific cluster in the first hidden layer and the weights associated with the cluster are set for that person/object(s) array pattern. Each time this array pattern enters from neural network 116, it maps to this cluster. The cluster is reset when it no longer matches incoming patterns. Each time that the cluster is activated, it sends excitatory signals containing the coordinates and time points associated with the person/object array to the second hidden layer. The areas of excitation in this layer track the person's movement through the store. A security alert 122 is generated when the pattern of neuron excitation indicates that the "person" carrying "object(s) sold by the store" is approaching the exit without passing through a check-out counter.

Neural network 118 is trained using patterns of movement that a person would follow through the store if they were to avoid the check-out counter. A backward-propagation algorithm 136 adjusts weights in each of the neural networks 110, 112, 114, 116, and 118 based on the hierarchical stacked neural network's success in detecting a shoplifter.

Second Detailed Embodiment

An Intelligent Control System that Directs Customer Calls to the Correct Department in a Large Organization This system answers a customer's telephone call and determines where it should be directed within the organization, based on the caller's oral statements and responses to questions asked by the system. The system is able to achieve the language proficiency of a three year-old and ask simple questions. The input to the system are the customer's utterances. These are first processed in a front-end recognition system that translates the utterances into words, measures the time intervals between words, and removes articles, prepositions, and conjunctions.

Figure 5:
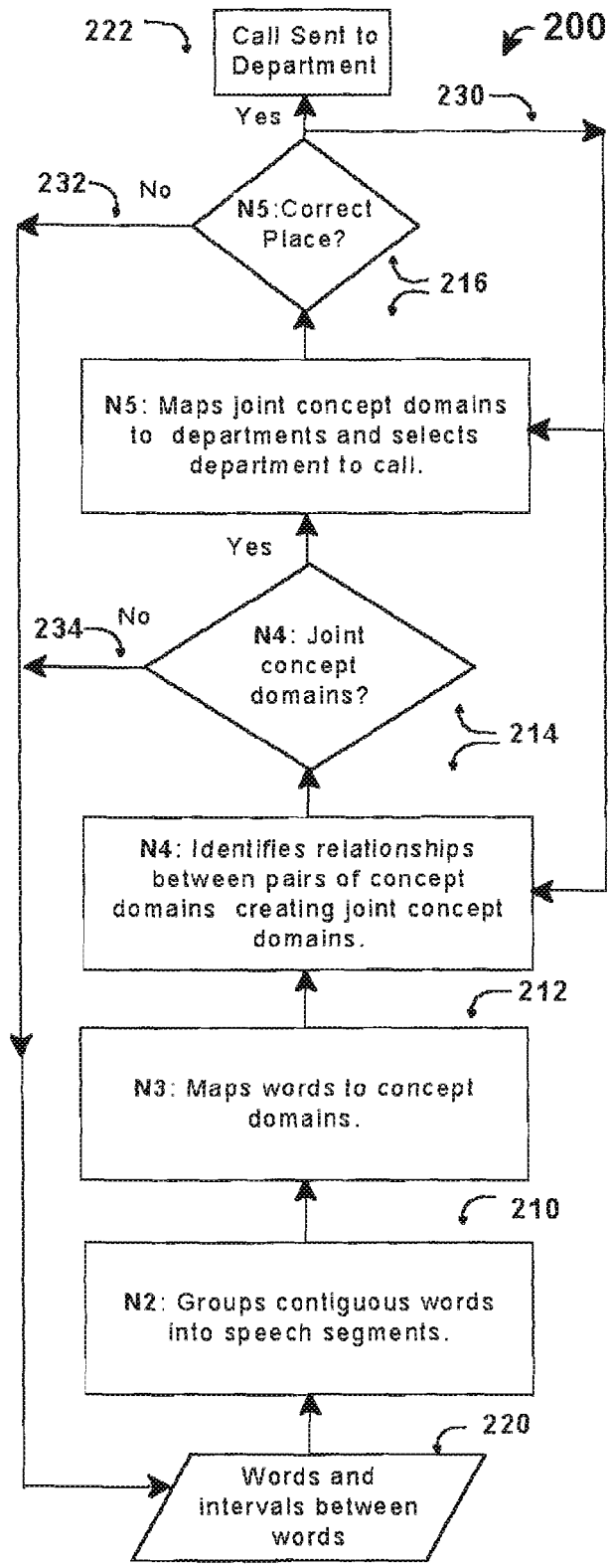
FIG. 5 is a flow chart for a second detailed embodiment of the present invention, an intelligent control system that directs customer calls to the correct department in a large organization.

Referring to FIG. 5, an intelligent control system 200 that directs customer calls to the correct department in a large organization comprises a stack of four (4) architecturally distinct, ordered neural networks 210, 212, 214, and 216. Each neural network 210, 212, 214, and 216 performs processing actions associated with a stage/order from the model described in Table 1. The first neural network 210 in the hierarchical stack performs processing actions at stage/order 2, the Sensory and Motor stage/order, in Table 1. The last neural network 216 in the stack performs processing actions at stage/order 5, the Sentential stage/order in Table 1. A front-end speech recognition system 220 translates customers' utterances into words, measures the time intervals between each word, and removes articles, prepositions, and conjunctions from the utterances. These are input into neural network 210.

Neural network 210 is an adaptive-resonance (ART) neural network with two resonating layers and a hidden layer. It performs processing actions at stage/order 2, the Circular Sensory Motor stage/order, of the model described in Table 1. At this stage/order, an intelligent system can form open-ended classes. Neural network 210 groups contiguous individual words, based on time intervals between words that naturally segment speech.

Input to neural network 210 are words from speech recognition system 220. A special signal indicates the end of the customer's speech. Each word is mapped to an output cluster, based on the time interval between that word and the preceding word. Each time a word is mapped to a cluster in the outer resonating layer, the weights are adjusted based on the inter-word interval. If a word enters with a time interval that deviates statistically by two standard deviations or more from the other time intervals mapped to the cluster, the current group of words is output to the hidden layer. When all words in a customer's utterance have been mapped into groups and the end of speech signal is detected, the output neuron is activated, and all word groups are output to neural network 212. Each group is assigned a group number that neural network 214 uses to pair words. Inter-word interval weights are not reset, since it is presumed that time intervals between words will be fairly consistent for an individual speaker. The training of neural network 210 is unsupervised.

Neural network 212 is a feed-forward, heteroassociative neural network with one hidden layer. It performs processing actions at stage/order 3, the Sensory-Motor stage/order, of the model depicted in Table 1. At this stage/order, an intelligent system can label and name simple objects. Training for neural network 212 is supervised. The network is initially taught words that are central to the company environment. These words include company products and key departments within the company that a customer might want to reach. For example, for a computer company, the network would be taught words such as software, laptop, computer, keyboard, and other words that relate to the computer products that the company sells. It would also be taught words for departments such as customer service, billing, and repair.

The inputs to neural network 212 are the word groups output from neural network 210. Words within each group are individually mapped to output clusters based on the word patterns that neural network 212 has been trained to recognize. Each cluster forms a concept domain. Words that are highly similar or alternate names for the same concept are mapped to the same cluster. Concept domains are initially fixed during training, but they expand based on the words that are input. The mapping of a word to a concept domain sends a weight to an output neuron associated with the domain. The output neuron sums the weights sent to it during the processing of words within the word groups. The group number from which a word comes is also sent to the output neuron. When all of the words in the groups input from 210 have been mapped, output neurons for each domain which have weights of one or greater are activated. Each activated output neuron outputs the domain pattern, its weight, the concept associated with the domain, and the group numbers of the words mapped to the domain, all of which are input to neural network 214.

Neural network 214 is a feed-forward neural network with a hidden layer that performs processing actions at stage/order 4, the Nominal stage/order, of the model described in Table 1. At this stage/order, an intelligent system can form simple relationships between two concepts. In neural network 214, relationships between pairs of domains output in neural network 212 are identified based on domain weights, domain patterns, and membership in a word group. It is presumed that two domains are more likely to be related conceptually if they are part of the same input group of contiguous words that was identified in neural network 210. Neural network 214 attempts to find a joint cluster pattern for all combinations of the domain patterns output by 212.

Training of neural network 214 is supervised. All possible interconnections between concept domains are taught to the system during training. The interconnections that are taught are based on the company's functions, products, and services. The domain weights and word groups from neural network 212 adjust the weights in the hidden layer to make it more or less likely that a joint cluster group will be found for a pair. For example, if two domains are activated by words from the same input group identified in neural network 210, it is more likely that the concept domains are related. In this case, weights on neurons in the hidden layer that are associated with the joint domain cluster are increased to create additional excitatory input to the output neuron. When an output neuron is activated, a joint domain pattern and a weight that indicates the level of excitation that triggered the neuron are output to neural network 216.

All possible pairings based on the input from neural network 212 are processed. If no joint domain patterns are output, a request 234 for more information is made to the customer using pre-prepared scripts. If more than one joint cluster pattern receives sufficient excitation to be activated, both joint domain patterns are output to a neural network 216. A feedback algorithm 230 adjusts input and activation weights in neural network 214 based on whether the customer's call was successfully matched to a department by neural network 216.

Neural network 216 is a feed-forward neural network with two hidden layers that performs processing actions at stage/order 5, the Sentential stage/order, of the model described in Table 1. At this stage/order, an intelligent system can form simple sentences and understand relationships between more than two concepts. Each joint domain pattern is mapped to a cluster of neurons in the first layer. This layer consists of clusters of neurons that represent relationships between key products and functions performed by the company. The cluster patterns in this layer are learned through supervised training. Multiple clusters of neurons can be activated on this level depending on the number of joint domain patterns input from neural network 214. The clusters of neurons that are activated on this level are output to the next layer as a topographical vector which summarizes the areas of activation on the plane formed by this layer. The vector created by the activation points then maps into possible locations that the customer's call might be sent to. This layer is a competitive one, and the ultimate activation of an output neuron is based on excitatory and inhibitory input from other neurons in the layer. The excitatory and inhibitory input from these neurons is based on the strength of the joint domain patterns input to neural network 216 from neural network 214. If neural network 216 must choose between two locations to send a customer's call to, then the joint domain pattern with the stronger weight prevails. The prevailing output neuron triggers a statement to the customer inquiring whether they would like to be transferred to the department or location selected by the network. If the customer agrees, then a feedback algorithm 230 adjusts the weights in neural network 216 and neural network 214 to reflect a successful resolution of the customer's inquiry, and a call 222 is sent to the department or location. If the customer rejects the suggestion, then the customer's inquiry has not been successfully resolved, and the process begins again with a request 232 to the customer to provide additional information. Weights in neural network 214 and neural network 216 are also adjusted by feedback algorithm 230 to reflect that the neural network failed to make the correct linkages between concepts.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The invention claimed is:

1. A hierarchal neural network architecture, comprising:
at least three architecturally distinct, separately trainable, neural networks disposed at differing levels within a hierarchy, the at least three neural networks each having a plurality of neurons, and at least one respective input and at least one respective output, and being ordered within the hierarchy to represent different levels of cognitive complexity, and having interconnections with neural networks at adjacent higher and lower hierarchal levels, wherein outputs from each neural network at a respectively lower hierarchal level provide input for, and a basis for an output of, a neural network at a next respectively higher hierarchal level, and modifying signals from each neural network at a respectively higher hierarchal level provide feedback for at least a neural network at a next respectively lower hierarchal level; and said outputs being defined in terms of non-arbitrary organizations of actions available to a respective neural network dependent on at least its respective hierarchal level and represented level of cognitive complexity, wherein outputs of neural networks at different hierarchal levels have respectively different non-arbitrary organizations of actions, a relationship of input to output of a respective neural network at a respective hierarchal level being a transformation of the inputs received, to an output representing said non-arbitrary organization of said actions available to said respective neural network, modified in dependence on the feedback received from neural networks at respectively higher hierarchal levels.

2. The hierarchal neural network architecture according to claim 1, wherein said non-arbitrary organization of said actions of at least one respective neural network is adapted for linguistic analysis, the hierarchal neural network architecture receiving semantic communication as an input.

3. The hierarchal neural network architecture according to claim 1, wherein said hierarchal neural network architecture comprises five architecturally distinct neural networks at respectively different levels within the hierarchy.

4. The hierarchal neural network architecture according to claim 3, wherein said five architecturally distinct neural networks at respectively different levels within the hierarchy correspond respectively to circular sensory-motor, sensory-motor, nominal, sentential, and pre-operational stages of cognitive development.

5. The hierarchal neural network architecture according to claim 1, comprising at least fourteen hierarchal levels at respectively different levels within the hierarchy.

6. The hierarchal neural network architecture according to claim 1, wherein each neural network at a respectively higher hierarchal level provides feedback for neural networks at all respectively lower hierarchal levels.

7. The hierarchal neural network architecture according to claim 1, wherein each neural network at a respectively higher hierarchal level processes data with an increasing degree of abstraction, and wherein said non-arbitrary organization of said actions provides an organizing constraint.

8. The hierarchal neural network architecture according to claim 1, wherein said nonarbitrary organization of said actions is predetermined for each level of said hierarchy.

9. A hierarchal neural network, comprising:
at least three architecturally distinct, separately trainable, neural networks disposed at respectively differing orders within a hierarchy, to represent different levels of cognitive development, and having interconnections with neural networks at adjacent higher and lower hierarchal orders, wherein outputs from each neural network at a respectively lower order provide input for a next respectively higher order, and modifying signals from each neural network at a respectively higher order provide feedback for at least a next respectively lower order, each order transforming and cognitively abstracting respective inputs received by it from respectively lower orders, to produce an output representing a non-arbitrary organization of actions having a higher cognitive complexity than the inputs, the non-arbitrary organization of actions of each order being modified in dependence on said feedback and being constrained in terms of non-arbitrary organizations of actions available to each order.

10. A method, comprising:
providing at least three architecturally distinct, separately trainable, neural networks disposed at differing levels within a hierarchy, each level within the hierarchy transforming at least one respective input to produce at least one output having a higher level of cognitive complexity, representing a level-specific constrained non-arbitrary organization of actions, ordered to represent different levels of cognitive complexity, and having interconnections with neural networks at adjacent higher and lower hierarchal levels;

receiving an input signal by at least one neural network;

communicating modifying signals from neural networks to provide feedback for at least one neural network at a next respectively lower hierarchal level;

communicating an output from the at least one neural network to provide input to a neural network at a next respectively higher hierarchal level; and transforming the input received by the at least one neural network to a respective output of increased cognitive complexity dependent on the non-arbitrary organization of said actions and the feedback received from neural networks at respectively higher hierarchal levels; and producing an output signal of increased complexity over the received input signal.

11. The method according to claim 10, wherein said non-arbitrary organization of said actions of at least one neural network within the hierarchy is adapted for linguistic analysis, further comprising the step of receiving a semantic communication as the received signal.

12. The method according to claim 10, wherein the hierarchy comprises five architecturally distinct neural networks.

13. The method according to claim 12, wherein each of said five architecturally distinct neural networks corresponds respectively to circular sensory-motor, sensory-motor, nominal, sentential, and pre-operational stages of cognitive development.

14. The method according to claim 10, wherein the hierarchy comprises fourteen architecturally distinct neural networks.

15. The method according to claim 10, wherein each neural network at a respectively higher hierarchal level provides feedback for neural networks at all respectively lower hierarchal levels.

16. The method according to claim 10, wherein each neural network at a respectively higher hierarchal level processes data with an increasing degree of abstraction, and wherein the non-arbitrary organization of actions provides an organizing constraint.

17. The method according to claim 10, wherein said the non-arbitrary organization of actions is predetermined for each level of the hierarchy.

18. The method according to claim 10, further comprising the step of separately training a neural network intended for a level of the hierarchy prior to interconnecting that neural network to other levels of the hierarchy.

19. A computer readable medium for storing program instructions to control a computer system to implement the method of claim 10.

20. The computer readable medium according to claim 19, wherein a plurality of neural networks are present at least one hierarchal level, wherein each such neural network at said at least one hierarchal level are trained together, further comprising the step of severing at least one of said plurality of neural networks from a remainder of the network while maintaining an operable system.

* * * * *